(12) United States Patent
Soares et al.

(10) Patent No.: US 8,869,172 B2
(45) Date of Patent: Oct. 21, 2014

(54) METHOD AND SYSTEM METHOD AND SYSTEM FOR EXCEPTION-LESS SYSTEM CALLS FOR EVENT DRIVEN PROGRAMS

(71) Applicant: Quietus Systems Inc., Toronto (CA)

(72) Inventors: Livio Soares, New York, NY (US); Michael Stumm, Toronto (CA)

(73) Assignee: Quietus Systems Inc., Toronto, ON (CA)

( * ) Notice: Subject to any disclaimer, the term of this patent is extended or adjusted under 35 U.S.C. 154(b) by 0 days.

(21) Appl. No.: 13/633,032

(22) Filed: Oct. 1, 2012

(65) Prior Publication Data

US 2013/0290644 A1   Oct. 31, 2013

Related U.S. Application Data

(60) Provisional application No. 61/541,161, filed on Sep. 30, 2011, provisional application No. 61/541,164, filed on Sep. 30, 2011.

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 3/06 | (2006.01) | |

(52) U.S. Cl.
CPC ..................................... *G06F 3/067* (2013.01)

USPC .......................................................... 719/318

(58) Field of Classification Search
None
See application file for complete search history.

(56) References Cited

PUBLICATIONS

Livio Soares, "Improving server efficiency through exception-less system calls," May 5, 2011, Microsoft presentation top-level webpage, retrieved from http://research.microsoft.com/apps/video/default.aspx?id=148595 on Sep. 4, 2013.*
Livio Soares, "Microsoft Research: Improving server efficiency through exception-less system calls," May 5, 2011, Microsoft presentation, pp. 1-56 (slides), ), retrieved via hyperlink "Slides PDF" from http://research.microsoft.com/apps/video/default.aspx?id=148595 on Sep. 4, 2013.*
Livio Soares, "Improving server efficiency through exception-less system calls," May 5, 2011, Microsoft presentation pp. 1-21 (transcript), retrieved via hyperlink "transcript (DOC)" from http://research.microsoft.com/apps/video/default.aspx?id=148595 on Sep. 4, 2013.*

* cited by examiner

*Primary Examiner* — H S Sough
*Assistant Examiner* — William C Wood
(74) *Attorney, Agent, or Firm* — Robert P. Stratton

(57) ABSTRACT

A method and system is disclosed which alters the performance of computer systems to make exception-less system calls, thus avoiding or reducing the direct and indirect overheads associated with making an exception-based system call. The invention can be employed with single core processor systems and with multi-core processor systems.

5 Claims, 4 Drawing Sheets

METHOD AND SYSTEM METHOD AND SYSTEM FOR EXCEPTION-LESS SYSTEM CALLS FOR EVENT DRIVEN PROGRAMS

RELATED APPLICATIONS

This application claims priority from U.S. provisional patent application Ser. Nos. 61/541,161 and 61/541,164, each filed Sep. 30, 2011, and the contents of each of these provisional patent applications are included herein, in their entirety, by reference.

FIELD OF THE INVENTION

The present invention relates to a system and method for improving the performance of computer operating systems. More specifically, the present invention relates to a system and method for providing and performing exception-less system calls in a computer operating system and for allowing event driven programs to use exception-less system calls.

BACKGROUND OF THE INVENTION

Most modern computers, and especially general-purpose computer systems, execute an operating system which manages the computer's resources and provides a set of common services for application programs which are to be executed on the computer. Operating systems typically act as an intermediary layer between application programs and the computer resources, providing and managing services such as memory allocation and input and output (I/O) functions, such as reading and/or writing information to and from disc drives, or their equivalent.

Most operating systems employ a security model which features at least two modes in which the computer can operate. In the first mode, often referred to as "supervisor mode" or "kernel mode", the operating system has unrestricted access to the hardware and other resources of the computer system. Generally, only the operating system itself (or the kernel portion of the operating system) executes in supervisor mode. The second mode, often referred to as "protected mode" or "user mode" is the mode in which user applications and less important operating system components execute and software being executed in user mode cannot directly access the resources of the computer system such as the above-mentioned I/O and/or memory allocation functions.

Instead, when a user application requires access to I/O or other computer resources only available in kernel mode, the user application makes a request for those resources to the operating system. Such a request is typically referred to as a "system call" and the operating system receives the system call and attempts to fulfill the request.

When the operating system needs to perform tasks which can only be performed in kernel mode, the mode of the computer system must be switched from user mode to kernel mode and, when the request has been fulfilled, the mode must be switched back from kernel mode to user mode. These switches, often referred to as "mode switches" or "context switches", are performed by the operating system executing a special instruction which results in a processor "exception" which allows the computer system to change from user mode to kernel mode where the requested system call can be processed and/or back again.

Operating systems which employ this security model have been in widespread use for many years and are the presently preferred method of implementing general-purpose (and many special purpose) computer systems. However, problems exist with these systems. In particular, modern computer systems are typically now superscalar which means that more than one instruction can be executed by the processor in parallel in different parts of the processor. Superscalar systems typically include a set of features such as instruction pipelines, multi-level data and instruction caches, out of order and/or predictive execution units, translation look aside buffers, etc. which assist in achieving superscalar performance.

Modern superscalar systems now commonly also have multiple processors (i.e.—cores") further increasing the ability of the computer system to execute multiple instructions in parallel. As used herein, the term "superscalar" is intended to comprise computer systems which can execute more than one instruction in parallel and includes both single core and multi-core computer systems.

While superscalar computer systems provide significant advantages, they do suffer from some problems. In particular, many of the superscalar features of such systems require the executing program to display locality of execution to benefit from these features. Without locality of execution, features such as caches, predictive execution units, etc. cannot provide their advantages and the rate of instructions executed per cycle by a superscalar computer system will drop significantly without locality of execution.

SUMMARY OF THE INVENTION

It is an object of the present invention to provide a novel system and method for providing and performing exception-less system calls in a computer operating system which obviates or mitigates at least one disadvantage of the prior art.

According to a first aspect of the present invention, there is provided a non-transitory computer readable medium having instructions stored thereon for a system of performing exception-less system calls on a computer system executing an operating system having a user mode and a kernel mode, the operating system executing at least one event driven user application, comprising: instructions for creating a shared memory space between the at least one user application executing in user mode and the operating system executing in kernel mode; instructions for the user application to execute a task allowing a request for at least one system call to be placed into the shared memory space, the task from time to time checking for completion of the system call and informing the at least one user application when the system call is completed; instructions for the operating system, in kernel mode, to check the shared memory space from time to time to identify system calls requested by the at least one user application; and instructions for the operating system to perform at least one identified system call for the at least one user application and to indicate completion of the at least one identified system call to the at least one user application via the shared memory space.

Preferably, the non-transitory computer readable medium further includes instructions to have the operating system perform the at least one requested system call on a temporally scheduled basis or, where the computer system includes at least two processor cores, further including instructions to have the operating system select at least one of the at least two processor cores and to cause the system calls to be preferentially performed on the selected at least one processor core.

According to another aspect of the present invention, there is provided a computer-implemented method of performing exception-less system calls on a computer system executing an operating system having a user mode and a kernel mode, the operating system executing at least one user application, the method comprising the steps of: creating a shared memory space between the user application and the operating system for each at least one user application; in the shared memory space of each at least one user application, creating a system call entry for each of at least one exception-less system call; instantiating a system call thread in the operating system kernel for each system call entry in each shared memory space; instantiating a user application thread which is operable to, in response to a request from the user application, set the contents of the at least one system call entry to request the performance of a system call by the operating system and to set the status of that system call entry appropriately and to, from time to time, check the status of the system call entries in the shared memory space to determine when a corresponding exception-less system call has been completed; and causing a system call thread executing in the kernel space of the operating system to check the status of at least one system call entry in the shared memory space to identify a requested exception-less system call waiting to be performed and to execute the system call requested by that system call entry and to update the corresponding status of that system call entry.

The present invention teaches a method and system which can enhance the performance of computer systems by altering the operation of the operating system of those computer systems. The invention provides a system and method for making exception-less system calls, from event driven programs or synchronous programs, thus avoiding or reducing the direct and indirect overheads associated with making an exception-based system call. In tests, significant improvements in overall performance of a computer system have been achieved.

The present invention improves the performance of user applications executing on a computer system executing an operating system by decoupling the execution of system calls from the invocation of system calls, thus improving execution locality within the computer system.

The invention can be employed with single core processor computer systems and with multi-core processor computer systems, both affording improved temporal execution locality and the later also providing improved spatial execution locality. The system and method can be employed in a wide range of operating systems.

Other features and advantages of the present invention are described more fully below.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
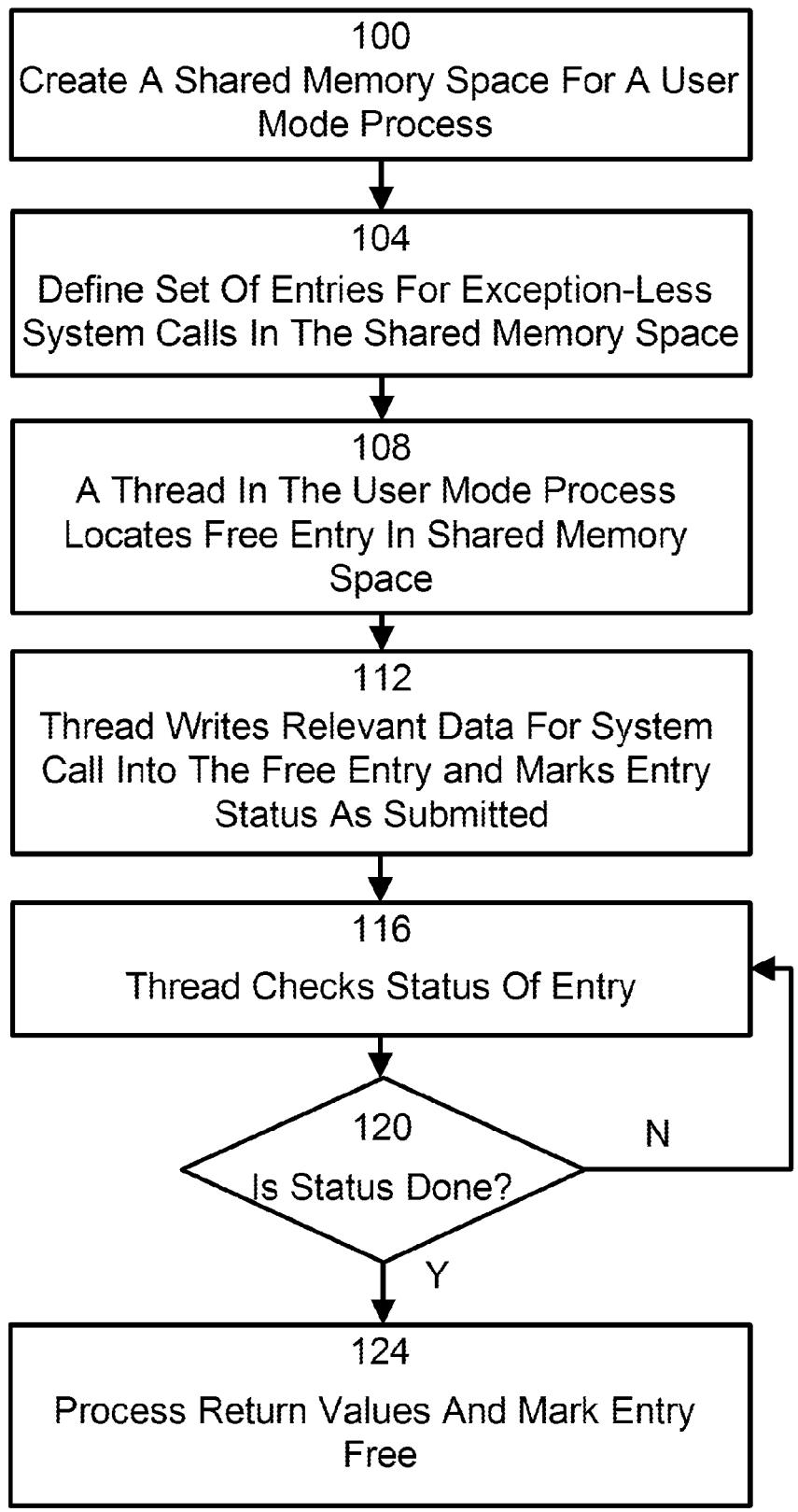
FIG. 1 shows a flowchart of the method of a user space process making an exception-less system call.

The present inventors have determined that, during a context switch between user mode and kernel mode, or vice versa, the contents of caches, buffers, pipelines and other superscalar optimization features are "polluted" (i.e.—their contents and/or state invalidated) by the context switch as locality of execution is lost.

In tests, the present inventors have found that a significant drop in the instruction per cycle (IPC) rate of a computer system occurs when a system call is made. This drop is both due to the direct overhead associated with saving the contents of system registers and performing the context switch and to the indirect overhead associated with the resulting pollution of superscalar features. In fact, in tests by the inventors, it was found that the performance degradation from indirect overhead was significantly larger than that resulting from the direct overhead.

Accordingly, to reduce the degradation of the performance of superscalar computer systems which results from context switches in prior art operating systems, the present inventors have developed an exception-less system call system and method.

In conventional operating systems, a system call is made by writing necessary values to appropriate system registers and having the processor execute a special instruction that results in a processor exception. The processor exception results in the user-mode instruction pipeline being flushed, the saving of a predefined set of register values onto the kernel stack, changing the processor domain from user mode to kernel mode and redirecting execution to the registered exception handler. As part of this process, superscalar features like the L1 data and instruction caches, translation look-aside buffers, branch prediction tables, prefetch buffers and larger unified caches (i.e.—L2 and L3) have user mode data overwritten with kernel mode data and are thus polluted and execution locality is lost.

Returning from kernel mode, after the exception has been handled, the results of the system call are written to defined registers, the saved user mode register values are pulled from the stack and the domain is switched from kernel mode to user mode.

The loss of execution locality which results from this process is significant and, in tests conducted by the inventors, the IPC rate of the computer system upon return from a system call was significantly lower than the IPC rate prior to making the system call and many thousands of cycles were required to re-achieve the pre-system call IPC rate.

To reduce the loss of execution locality resulting from system calls, the present inventors have developed what they refer to as an exception-less system call. In fact, the present inventors have developed two approaches to an exception-less system call: the first being the batching of system calls; and the second, for multi-core systems, being core specialization. As will be apparent, the exception-less system call of the present invention can employ either or both of these approaches, as desired.

With the batching of system calls, the execution of one or more system calls is delayed and then those delayed system calls are subsequently executed as a batch. Thus, instead of performing a separate context switch for each system call, a context switch is only incurred once for the set of system calls and this improves temporal locality of execution.

For multi-core systems, an exception-less system call can be scheduled for execution on a core different from the core on which the system call was invoked, thus providing improved spatial locality and reducing indirect overheads.

In a current embodiment of the present invention, the interface for the exception-less system call is one or more memory pages that are shared between user and kernel spaces. These pages, referred to herein as syscall pages, are organized to contain exception-less system call entries, each entry containing space for the request status (i.e. "free", "submitted", "busy", "cancel", "done", etc.), a system call number, arguments and return values.

While the description herein employs the term "thread" when referring to executing processes within the computer system, it is intended that the term "thread" not be a limitation to the scope of the invention and that "thread" should be read to also encompass other execution units (i.e.—processes, tasks, etc.) which are available in operating systems with architectures and/or operating modalities that offer such execution units either instead of, or in addition to, threads.

To make an exception-less system call, a user space thread locates a free entry in the syscall pages, by checking the value of the status field, and populates that free entry with the necessary and appropriate values required for the particular system call using regular store instructions. Once the syscall entry has been populated, the user space thread marks the status of that entry to "submitted" and the user space thread can then continue executing without interruption.

The user space thread then later checks the status of the exception-less system call by reading the status information in the corresponding entry in the syscall pages until the status is "done". When done, the user thread can appropriately process any return values and will mark the status of the entry in the syscall page as "free" to allow the entry space to be reused. The user space thread can then continue its execution again.

As will be apparent, none of these operations (storing values in the syscall pages or reading the results from the syscall pages) causes an exception to be raised, hence the term exception-less system call.

While the above-discussion refers to syscall pages, the present invention is not so limited and any shared memory space can be used with the present invention to pass exception-less system call entries between user mode and kernel mode, as will occur to those of skill in the art.

Unlike exception based system calls, an exception-less system call does not create an explicit notification to the kernel that a call has been made, nor is an execution stack provided. Instead, with the present invention a kernel thread, referred to herein as a "syscall thread", executes in kernel mode for each process executing on the computer system which employs exception-less system calls.

Syscall threads execute to, according to a schedule: identify and pull waiting exception-less system call requests from the syscall pages or other shared memory structure; to appropriately execute those calls on behalf of the requesting user-mode thread; to place any return values in the corresponding syscall page entry; and to update appropriately its status in the corresponding syscall page entry.

In a specific embodiment of the present invention implemented in Linux and subject to the Linux thread blocking architecture/model, a syscall thread is created for each entry in the syscall, or other shared memory, for each process employing exception-less system calls. Despite creating multiple syscall threads, only one syscall thread is active per user application and core (in multi-core computer systems) at any given time. If the system call does not block, all execution is performed by the one syscall thread while the remaining syscall threads sleep on a work queue. However, if the execution of the requested exception-less system call is blocked (by resource contention, etc.), immediately before the syscall thread is put to sleep, the next syscall thread on the work queue is awoken and starts executing the next system call. When the resources required by the first syscall thread (now sleeping) become free, it is awakened and resumes its execution.

Suitable modifications and alternatives to this blocking mechanism will be apparent to those of skill in the art and, depending upon the architecture and models employed by the target operating system, may vary significantly from that described above for the Linux model.

As should now be apparent, a great deal of flexibility is available in scheduling the execution of system calls by syscall threads. As mentioned above, syscall threads can be scheduled to execute on one or more selected cores in a multi-core system, typically the selected core is different from the core on which the requesting user thread is executing, to improve spatial locality. Similarly, syscall threads can be scheduled to execute at a variety of times and/or after specified events, including at: pre-selected time intervals; or when user space threads are unable to make further progress without execution of waiting systems calls; or combinations of these intervals and timings; etc.

As will be apparent, if desired these scheduling methods can be combined to improve both temporal and spatial execution locality.

In a present single core embodiment of the present invention on the Linux system (kernel version 2.6.33), if no blocking occurs, the executing syscall thread processes all system calls, in sequence before switching back to user mode. If a system call is blocked, the executing syscall thread awakens another syscall thread which will begin processing the remaining system calls awaiting processing, again executing all remaining non blocked system calls, or if blocked, awakening another syscall thread, etc. All pending system calls are either finished, or blocked, with at least one system call having been completed, before the computer system is returned to user mode.

In a present multi-core embodiment of the present invention on the Linux system, the execution of syscall threads is biased to a subset of the available cores, the subset either being dynamically specified in accordance with the workload of the computer system or, in a simpler case, being statically defined. Execution of syscall threads is preferentially assigned to one of the subset of cores which is not presently executing a syscall thread to enhance spatial execution locality.

As should be apparent to those of skill in the art, the implementation of exception-less system calls in accordance with the present invention can be achieved in addition to prior art exception-based system call mechanisms. In fact, it is contemplated that such a coexistence of system call mechanisms will be the norm as start up and initialization of many computer operating systems will require exception-based system calls. Further, avoiding the pollution of superscalar features by some system calls will not be of concern.

FIG. 1 shows a flowchart explaining the method of a user space process making an exception-less system call. The method starts at step 100 wherein a shared memory space, such as the above-described syscall pages, is created for the process executing in user mode space. The creation of this shared memory space can be achieved in a wide variety of manners, as will occur to those of skill in the art, and will depend upon the particular operating system on which the present invention is implemented. The shared memory space can be proactively created at the time of creation of the process, or can be subsequently created the first time the process wishes to make an exception-less system call.

At step 104, a set of entries of data structures necessary for making an exception-less system call and providing return values is created in the share memory space and each of these entries includes a status field which is initialized to indicate that the entry is free.

When a thread in the user mode process needs to make an exception-less system call, the thread locates an entry in the shared memory space whose status is indicated as being "free", as shown at step 108.

Next, at step 112 the thread writes the relevant data required to make the desired system call into the entry identified at step 108 and changes the status of that entry to "submitted".

The thread can then continue execution but also checks, from time to time, the status of the entry as indicated at step 116. When the status of the entry is "done", as indicated at step 120, the method continues to step 124 wherein the thread processes any return values from the exception-less system call and makes the entry in the shared memory as again being free and then the thread continues its execution.

Figure 2A:
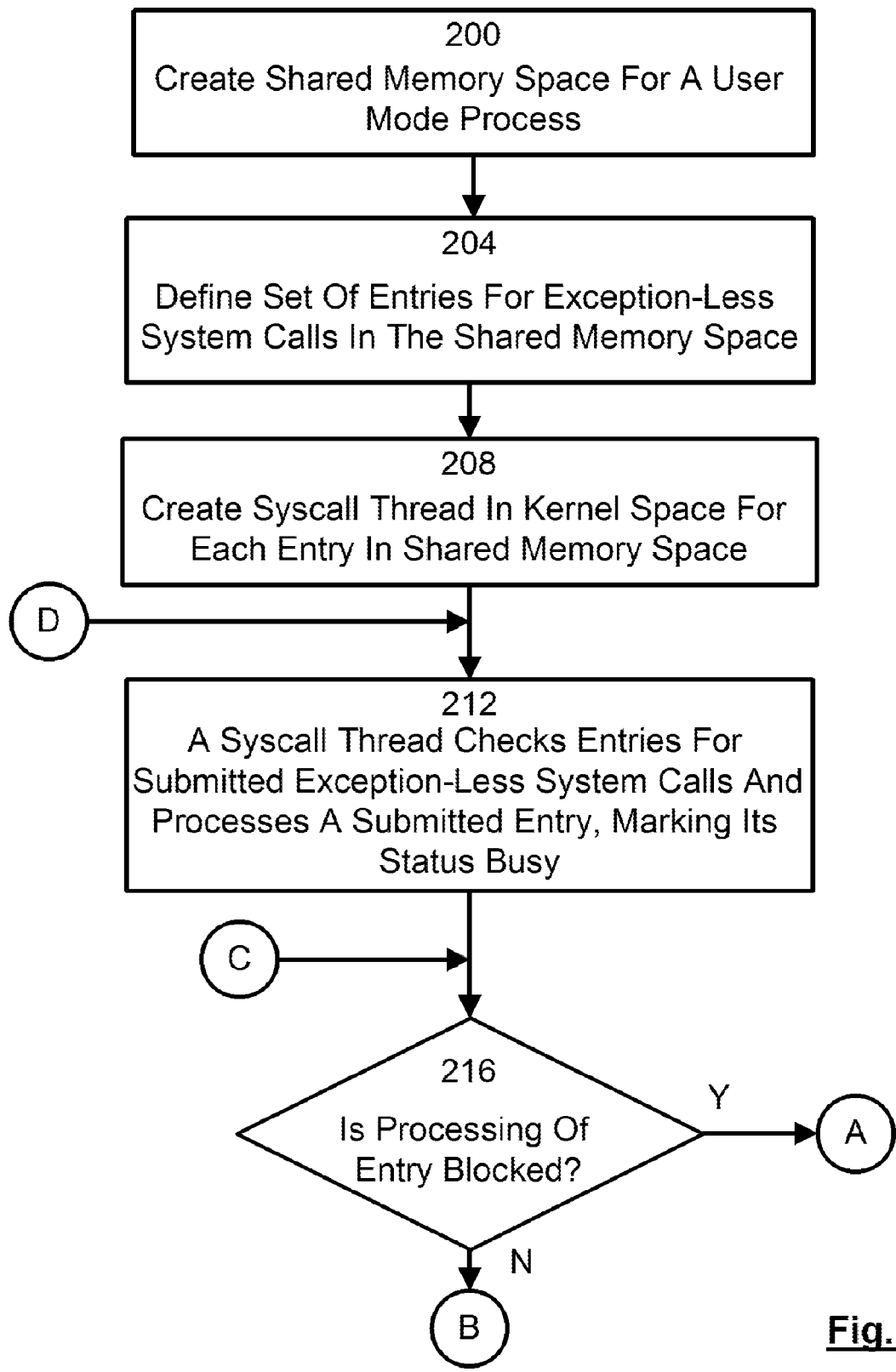
FIGS. 2a, 2b and 2c show a flowchart of the method of kernel space processing of exception-less system calls in one operating system environment.
Figure 2B:
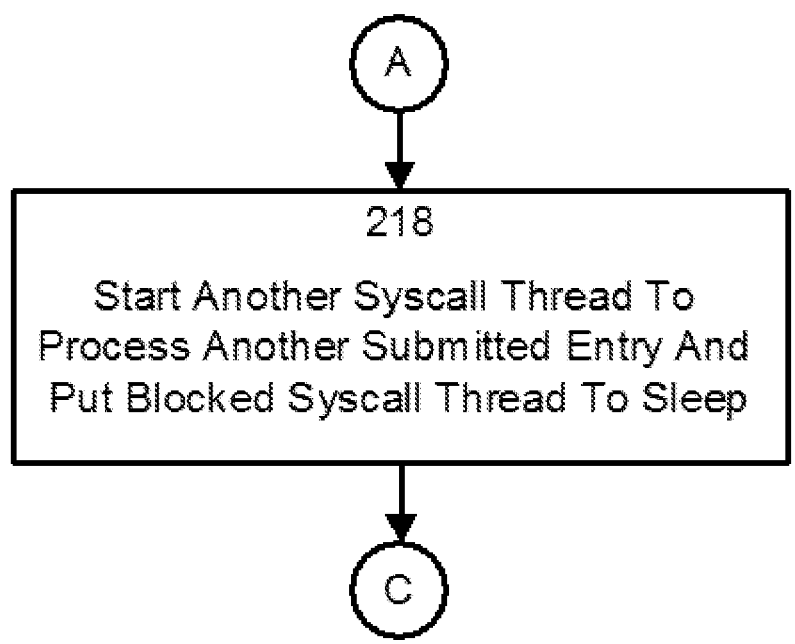
Figure 2C:
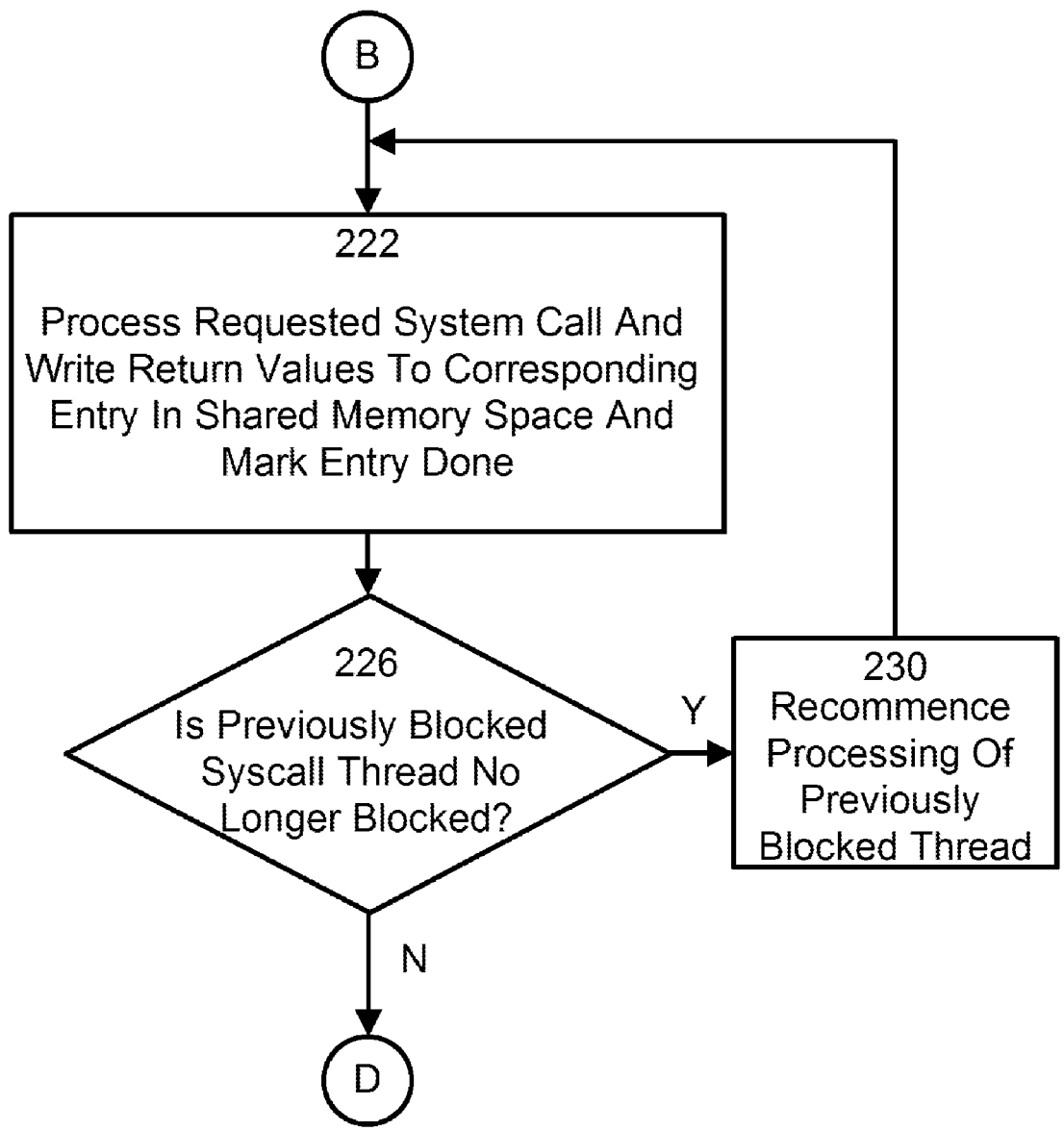

FIGS. 2a, 2b and 2c show a flowchart explaining the method of kernel space processing of exception-less system calls in a Linux operating system environment or other environment having a similar thread blocking architecture.

The method commences at step 200 where the operating system creates a shared memory space for a process executing in user mode. As will be apparent, this step corresponds to, and is the same as, step 100 in FIG. 1. Next, at step 204, a set of entries of data structures necessary for making an exception-less system call and providing return values is created in the share memory space and each of these entries includes a status field which is initialized to indicate that the entry is "free". This step corresponds to, and is the same as, step 104 in FIG. 1.

Next, at step 208, a syscall thread, or other suitable execution unit, is created in the operating system kernel space for each entry created in step 204 in the shared memory space. As discussed above, the creation of this multiplicity of syscall threads is desired when dealing with the Linux thread blocking architecture and may not be desired or required under other operating systems and the present invention is not limited to use with such a thread blocking architecture.

At step 212, a syscall thread checks the entries in the shared memory to locate an entry with a status of "submitted" and commences processing of the system call requested in that entry, updating its status to "busy".

At step 216, the syscall thread determines if processing of the requested system call is blocked and, if it is, the method continues at step 218.

At step 218, another syscall thread is started by the blocked syscall thread which his then put to sleep. The newly started syscall thread checks for entries in the shared memory space with a status of "submitted" and begins processing the entry. The method then returns to step 216.

If at step 216, the processing of the requested system call is not blocked, the method continues at step 22 where processing of the requested system call is completed. The syscall thread writes any return values from the system call to the corresponding entry in the shared memory and marks the status of that entry as "completed".

At step 226 the method checks to see if any previously blocked syscall thread is no longer blocked. If such an unblocked thread exists, the method proceeds to step 230 wherein execution of that thread is recommenced and the method returns to step 222.

If, at step 226, no previously block syscall thread exists, or any such blocked syscall thread remains blocked, processing returns to step 212.

As will be apparent, the method of FIGS. 2a, 2b and 2c can be easily modified by those of skill in the art for operating systems with resource contention architectures which differ from the Linux thread blocking architecture described herein.

As will also be apparent, the method of FIGS. 2a, 2b and 2c does not explicitly show the scheduling of syscall threads. As discussed above, a variety of scheduling approaches can be employed with the present invention including those which enhance temporal execution locality and, in multi-core computer systems, those which enhance spatial execution locality.

Perhaps surprisingly, it has been determined that the present invention can also be used effectively with event driven application programs, such as event driven servers, executing on computer systems.

Such event driven applications can employ threads or non-blocking/asynchronous I/O to handle concurrent requests. Thread-based implementations are often considered the simpler approach to handling concurrent requests as the operating system inherently tracks the progress of I/O operations.

A disadvantage of threaded servers that utilize a separate thread per request/transaction is inefficiency of handling a large number of concurrent requests. The two main sources of this inefficiency are the extra memory usage allocated to thread stacks and the overhead of tracking and scheduling a large number of execution contexts.

To reduce the overheads of threading, developers have typically adopted use of event-driven programming wherein the program is structured as a state machine driven by the progress of various operations, typically involving I/O.

Event-driven programs make use of non-blocking, or asynchronous, primitives, along with event notification systems to deal with concurrent I/O operations. While these primitives allow for uninterrupted execution that enables a single execution context (i.e.—a single thread), to fully utilize the processor, they do suffer from disadvantages. In particular, a major disadvantage is that it requires a more complex programming model, wherein the application is responsible for tracking the status of I/O operations and the availability of I/O resources. Further, the application must support multiplexing the execution stages of multiple concurrent requests.

In both models of I/O concurrency, the operating system kernel play a critical role in multiplexing the execution of concurrent requests. Therefore, it is critical for the operating system to support efficient I/O multiplexing primitives. Management of both I/O requests and events is therefore split between the application and the operating system kernel and thus there is a need for continuous communication between the application and the operating system kernel.

Conventional implementations of asynchronous I/O provide signal or interrupt-based completion notifications. Completion notification allows the kernel to notify a user thread that a previously issued asynchronous request has been completed. While such completion notifications are thus very useful, they typically are implemented through a signal or other upcall mechanism which has the same adverse effects on execution locality (and thus system performance) that system calls have and which the present invention endeavors to reduce. The present inventors have determined that the high frequency of mode switching required for this communication is largely responsible for the low execution efficiency demonstrated by many event-driven applications. Thus, with the present invention such completion notification methods are not offered.

To allow event-driven applications to employ the exception-less system calls of the present invention, a notification library for asynchronous system calls has been developed. The main loop of this notification library polls the syscall pages, described above, currently in use to determine the completion of system calls. To reduce overhead, the polling for system call completion is only performed when all currently pending callback handlers have completed. With sufficient work/load, polling should occur relatively infrequently.

In the case that all callback handlers have completed and no new exception-less system calls have completed, the notification library notifies the kernel that it cannot continue until one or more of the pending system calls is completed.

The notification library provides appropriate system call functions including "accept", "read", "open", "sendfile", 'close", etc. and associated callback handlers. When the notification library detects that a system call has been completed, the corresponding callback handler is invoked, effectively driving the next stage of execution of the state machine within the user application.

As is known, cancellation of in-progress system calls may be necessary in some cases. For example, with non-blocking system calls, reads are often implemented by waiting for a notification that the requested socket has become available and, if the socket does not become available within a specified timeout period, the connection is closed. With the exception-less system calls of the present invention, the read request is issued before the user application knows if or when new data will arrive. To implement a timeout, the user application must explicitly cancel pending reads if the timeout period has expired.

To enable system calls to be cancelled, when checking for new requests syscall threads, in addition to the steps described above, also check for entries whose state has been changed to cancel by the user applications (via an appropriate function call in the notification library). To cancel an in-process system call, the syscall thread executing that system call is identified and a signal is sent to the executing thread to interrupt its execution. When the syscall thread wakes up, it sets its return vale to a predefined value, indicating the that system call was cancelled and sets its status to "done". As will be apparent, due to the asynchronous implementation, cancellation of system calls is not guaranteed to succeed. Thus, the user application must check the exception-less system call return value to disambiguate between system calls that were cancelled and those which were completed.

As should now be apparent, the present invention provides a method and system which can enhance the performance of computer systems by altering the operation of the operating system of those computer systems. The invention provides a system and method for making exception-less system calls, thus avoiding or reducing the direct and indirect overheads associated with making an exception-based system call. In test environments, significant improvements in overall performance of a computer system have been achieved. The present invention can also be employed with user applications employing an event-driven architecture, such as event-driven servers.

The invention can be employed with single core processor computer systems and with multi-core processor computer systems, both affording improved temporal execution locality and the later also providing improved spatial execution locality. The system and method can be employed in a wide range of operating systems.

The above-described embodiments of the invention are intended to be examples of the present invention and alterations and modifications may be effected thereto, by those of skill in the art, without departing from the scope of the invention which is defined solely by the claims appended hereto.

We claim:

1. A non-transitory computer readable medium having instructions stored thereon for a system of performing exception-less system calls on a computer system executing an operating system having a user mode and a kernel mode, the operating system executing at least one event driven user application, comprising:

instructions for creating a shared memory space between the at least one user application executing in user mode and the operating system executing in kernel mode;

instructions for the user application to execute a task allowing a request for at least one system call to be placed into the shared memory space, the task from time to time checking for completion of the system call and informing the at least one user application when the system call is completed;

instructions for the operating system, in kernel mode, to check the shared memory space from time to time to identify system calls requested by the at least one user application; and instructions for the operating system to perform at least one identified system call for the at least one user application and to indicate completion of the at least one identified system call to the at least one user application via the shared memory space.

2. The non-transitory computer readable medium of claim 1 further including instructions to have the operating system perform the at least one requested system call on a temporally scheduled basis.

3. The non-transitory computer readable medium of claim 1 wherein the computer system includes at least two processor cores and further including instructions to have the operating system select at least one of the at least two processor cores and to cause the system calls to be preferentially performed on the selected at least one processor core.

4. The non-transitory computer readable medium of claim 1 wherein the instructions for the operating system cause a system call thread executing in the kernel mode of the operating system to check the status of at least one system call entry in the shared memory space to identify the at least one requested exception-less system call waiting to be performed and to execute the system call requested by the identified at least one exception-less system call entry.

5. A computer-implemented method of performing exception-less system calls on a computer system executing an operating system having a user mode and a kernel mode, the operating system executing at least one user application, the method comprising the steps of:

creating a shared memory space between the user application and the operating system for each at least one user application;

in the shared memory space of each at least one user application, creating a system call entry for each of at least one exception-less system call;

instantiating a system call thread in the operating system kernel for each system call entry in each shared memory space;

instantiating a user application thread which is operable to, in response to a request from the user application, set the contents of the at least one system call entry to request the performance of a system call by the operating system and to set the status of that system call entry appropriately and to, from time to time, check the status of the system call entries in the shared memory space to determine when a corresponding exception-less system call has been completed; and causing a system call thread executing in the kernel space of the operating system to check the status of at least one system call entry in the shared memory space to identify a requested exception-less system call waiting to be performed and to execute the system call requested by that system call entry and to update the corresponding status of that system call entry.

\* \* \* \* \*